US008204889B2

(12) United States Patent
Liu et al.

(10) Patent No.: US 8,204,889 B2
(45) Date of Patent: Jun. 19, 2012

(54) SYSTEM, METHOD, AND COMPUTER-READABLE MEDIUM FOR SEEKING REPRESENTATIVE IMAGES IN IMAGE SET

(75) Inventors: Yuan Liu, Beijing (CN); Gang Wang, Beijing (CN); Tao Li, Beijing (CN); Yinghui Xu, Kanagawa (JP); Caizhi Zhu, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/033,016

(22) Filed: Feb. 23, 2011

(65) Prior Publication Data

US 2011/0225172 A1   Sep. 15, 2011

(30) Foreign Application Priority Data

Mar. 11, 2010   (CN) .......................... 2010 1 0122006

(51) Int. Cl.
*G06F 7/00* (2006.01)
*G06F 17/30* (2006.01)

(52) U.S. Cl. ....................................... 707/748; 707/749
(58) Field of Classification Search ........................ None
See application file for complete search history.

(56) References Cited

U.S. PATENT DOCUMENTS

| 5,995,978 | A | 11/1999 | Cullen et al. | |
|---|---|---|---|---|
| 6,834,288 | B2* | 12/2004 | Chen et al. | 1/1 |
| 7,499,916 | B2* | 3/2009 | Liu et al. | 1/1 |
| 7,512,275 | B2* | 3/2009 | Yumoto et al. | 382/224 |
| 8,073,818 | B2* | 12/2011 | Duan et al. | 707/687 |
| 8,112,428 | B2* | 2/2012 | van Leuken et al. | 707/748 |
| 2001/0041008 | A1* | 11/2001 | Kasutani | 382/218 |
| 2006/0153456 | A1* | 7/2006 | Foote | 382/190 |
| 2007/0094251 | A1 | 4/2007 | Lu et al. | |
| 2009/0207281 | A1* | 8/2009 | Ono | 348/234 |
| 2010/0067027 | A1* | 3/2010 | Kunieda | 358/1.9 |
| 2010/0262605 | A1* | 10/2010 | Mikawa | 707/740 |
| 2010/0318525 | A1* | 12/2010 | Mizuguchi et al. | 707/748 |
| 2010/0325581 | A1* | 12/2010 | Finkelstein et al. | 715/810 |

* cited by examiner

*Primary Examiner* — Kuen Lu
*Assistant Examiner* — Tuan A Pham
(74) *Attorney, Agent, or Firm* — Oblon, Spivak, McClelland, Maier & Neustadt, L.L.P.

(57) ABSTRACT

System, method, and computer-readable medium for seeking representative images in an image set. Text features of each of the plural images are extracted. Diversity data of the image set is obtained based on the text features. A representative score of each of the plural images is calculated based on the diversity data. One or more of the images in the image set is selected as a representative image based on the representative score of the corresponding images.

7 Claims, 9 Drawing Sheets

SYSTEM, METHOD, AND COMPUTER-READABLE MEDIUM FOR SEEKING REPRESENTATIVE IMAGES IN IMAGE SET

BACKGROUND OF THE INVENTION

1. Field of the Invention

The present invention relates to a system, a method, and a computer-readable medium for seeking one or more representative images in an image set.

2. Description of the Related Art

With the development of information storage techniques, the storage capacity of storage devices is improved day by day, and the amount of information stored in the storage devices becomes larger and larger. In actual life, for example, in an image set such as an electronic photo album including a lot of electronic images, there are many images that are not organized in general; as a result, it is difficult for a user to quickly grasp the overall content of the image set. In this case, if it is possible to automatically seek out one or more images that can mostly represent the contents of all the images in the image set (i.e. the so-called representative images), then user experience may be dramatically improved.

U.S. Pat. No. 5,995,978 discloses a navigation system for a document image database. With regard to a search term input by a user, the navigation system collects one or more images by carrying out text retrieval, then automatically groups the images by employing sense-of-vision features of the images, and then displays representative images of the respective groups.

In US Patent Application No. 2007/0094251, automated rich presentation of a semantic topic is described. The semantic topic may be one or more keywords, personal names, events, scenes, or the like.

SUMMARY OF THE INVENTION

In order to overcome the disadvantages of the prior art, the present invention provides a method and a system for seeking one or more representative images in an image set. The method and the system can automatically seek out the representative images in the image set in an effective way so that a user can quickly grasp the overall content of the image set, and user experience can be improved.

According to one aspect of the present invention, a method of seeking one or more representative images in an image set including plural images is provided. The method comprises a text feature extracting step of extracting one or more text features of each of the plural images in the image set based on original data of the corresponding images and/or annotation information input by a user; a diversity data obtaining step of obtaining diversity data of the image set based on the text features of each of the plural images in the image set, wherein, the diversity data is used to express discrepancies between contents of any two images in the image set; a representative score calculating method of calculating a representative score of each of the plural images based on the diversity data of the image set, wherein, the representative score is used to express a representativeness of a content of each of the plural images with regard to contents of all the images in the image set; and a representative image selecting step of selecting one or more images in the image set based on the representative score of each of the plural images in the image set, wherein, the one or more images represent the contents of all the images in the image set, and serve as the one or more representative images.

Furthermore the method further comprises a sense-of-vision feature extracting step of extracting one or more sense-of-vision features of each of the plural images in the image set; and a saliency data obtaining step of obtaining saliency data of each of the plural images based on the sense-of-vision features of the corresponding images in the image set, wherein, the saliency data is used to express a universality of each of the plural image with regard to the image set, wherein, the representative score is further based on the saliency data.

Furthermore, in the method, the representative image selecting step comprises a sorting step of sorting the representative scores of all the image in the image set based on the representative score of each of the plural images in the image set; and an image selecting step of selecting the one or more images in the image set based on the sorted result, wherein, the one or more images represent the contents of all the images in the image set, and serve as the one or more representative images.

Furthermore, in the method, the text feature extracting step comprises a text keyword database creating step of creating a text keyword database of the image set based on the original data of all the images in the image set and/or the annotation information input by the user; a text feature space creating step of creating a text feature space by selecting one or more text keywords from the text keyword database of the image set, wherein, the dimension of the text feature space is equal to the number of the selected text keywords; and a text feature forming step of forming the text features of each of the plural images by using the text feature space based on the original data of all the images in the image set and/or the annotation information input by the user.

Furthermore, in the method, the text feature space creating step comprises an appearance frequency calculating step of calculating an appearance frequency of each of the text keywords appearing in the text keyword database of the image set; and a text keyword selecting step of selecting one or more text keywords whose appearance frequencies are in a predetermined range so as to create the text feature space.

According to another aspect of the present invention, a system for seeking one or more representative images in an image set including plural images is provided. The system comprises a text feature extracting unit configured to extract one or more text features of each of the plural images in the image set based on original data of the corresponding images and/or annotation information input by a user; a diversity data obtaining unit configured to obtain diversity data of the image set based on the text features of each of the plural images in the image set, wherein, the diversity data is used to express discrepancies between contents of any two images in the image set; a representative score calculating unit configured to calculate a representative score of each of the plural images based on the diversity data of the image set, wherein, the representative score is used to express a representativeness of a content of each of the plural images with regard to contents of all the images in the image set; and a representative image selecting unit configured to select one or more images in the image set based on the representative score of each of the plural images in the image set, wherein, the one or more images represent the contents of all the images in the image set, and serve as the one or more representative images.

Furthermore the system further comprises a sense-of-vision feature extracting unit configured to extract one or more sense-of-vision features of each of the plural images in the image set; and a saliency data obtaining unit configured to obtain saliency data of each of the plural images based on the sense-of-vision features of the corresponding images in the image set, wherein, the saliency data is used to express a universality of each of the plural images with regard to the image set, wherein, the representative score is further based on the saliency data.

Furthermore, in the system, the representative image selecting unit comprises a sorting unit configured to sort the representative scores of all the image in the image set based on the representative score of each of the plural images in the image set; and an image selecting unit configured to select the one or more images in the image set based on the sorted result, wherein, the one or more images represent the contents of all the images in the image set, and serve as the one or more representative images.

Furthermore, in the system, the text feature extracting unit comprises a text keyword database creating unit configured to create a text keyword database of the image set based on the original data of all the images in the image set and/or the annotation information input by the user; a text feature space creating unit configured to create a text feature space by selecting one or more text keywords from the text keyword database of the image set, wherein, the dimension of the text feature space is equal to the number of the selected text keywords; and a text feature forming unit configured to form the text features of each of the plural images by using the text feature space based on the original data of all the images in the image set and/or the annotation information input by the user.

Furthermore, in the system, the text feature space creating unit comprises an appearance frequency calculating unit configured to calculate an appearance frequency of each of the text keywords appearing in the text keyword database of the image set; and a text keyword selecting unit configured to select one or more text keywords whose appearance frequencies are in a predetermined range so as to create the text feature space.

According to still another aspect of the present invention, a non-transitory computer-readable medium for seeking one or more representative images in an image set including plural images is provided. The non-transitory computer-readable medium has computer-executable instructions for execution by a processing system, the computer-executable instructions are for seeking one or more representative images in an image set including plural images, and the computer-executable instructions, when executed, cause the processing system to extract one or more text features of each of the plural images in the image set based on original data of the corresponding images and/or annotation information input by a user; obtain diversity data of the image set based on the text features of each of the plural images in the image set, wherein, the diversity data is used to express discrepancies between contents of any two images in the image set; calculate a representative score of each of the plural images based on the diversity data of the image set, wherein, the representative score is used to express a representativeness of a content of each of the plural images with regard to contents of all the images in the image set; and select one or more images in the image set based on the representative score of each of the plural images in the image set, wherein, the one or more images represent the contents of all the images in the image set, and serve as the one or more representative images.

According to the embodiments of the present invention, it is possible to extract the text features of each of the plural images in the image set based on the original data of the corresponding images and/or the annotation information input by the user, to obtain diversity data of the image set based on the text features so as to obtain the representative score of each of the plural images, and to select the representative images of the image set based on the representative score of each of the plural images. As a result, it is possible to automatically seek out the representative images in the image set in an effective way.

Furthermore, according to the embodiments of the present invention, aside from the diversity data, it is possible to extract the sense-of-vision features of each of the plural images in the image set, to obtain the saliency data of each of the plural images based on the sense-of-vision features of the corresponding images, to obtain the representative score of each of the plural images based on the diversity data and the saliency data, and to select the representative images from the image set based on the representative score of each of the plural images. As a result, it is possible to consider two aspects of diversity and saliency to obtain the representative images that can more sufficiently represent the contents of all the images in the image set by a more effective way.

DETAILED DESCRIPTION OF THE PREFERRED EMBODIMENTS

Hereinafter, various embodiments of the present invention will be concretely described with reference to the drawings.

Figure 1:
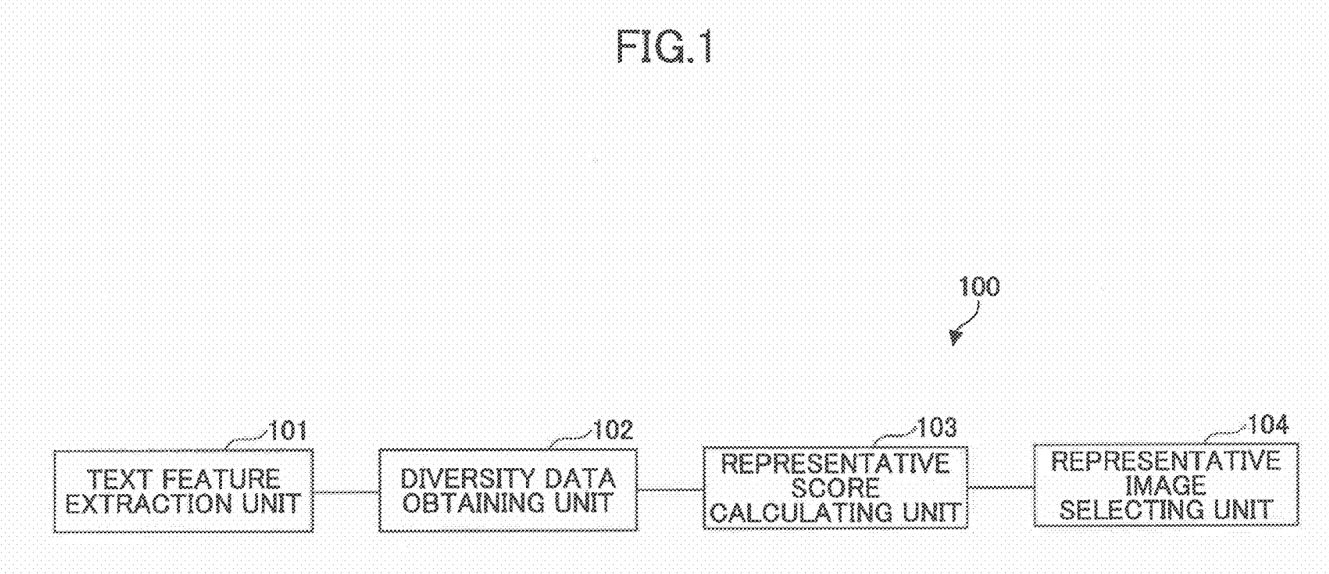
FIG. 1 is a block diagram of a representative image seeking system 100 according to an embodiment of the present invention.

FIG. 1 is a block diagram of a representative image seeking system 100 according to a first embodiment of the present invention.

As shown in FIG. 1, the representative image seeking system 100 according to the first embodiment of the present invention comprises a text feature extracting unit 101, a diversity data obtaining unit 102, a representative score calculating unit 103, and a representative image selecting unit 104.

In the representative image seeking system 100 according to the first embodiment of the present invention, the text feature extracting unit 101 extracts text features of all the images included in an image set based on original data of all the images and/or annotation information input by a user. The original data may include information related to attributes of the images themselves. For example, in a case where the images are photos, the original data may include photographing time, photographing locations, camera parameters, etc. The annotation information may include information related to the images, defined by the user, for example, image titles and image explanation. It should be noted that the structure and the operation of the text feature extracting unit 101 will be concretely described below by referring to FIG. 3.

The diversity data obtaining unit 102 obtains diversity data of the image set based on the text features of the images. The diversity data is used to express discrepancies between contents of any two images in the image set; it reflects degree of diversification of the image set.

Figure 7:
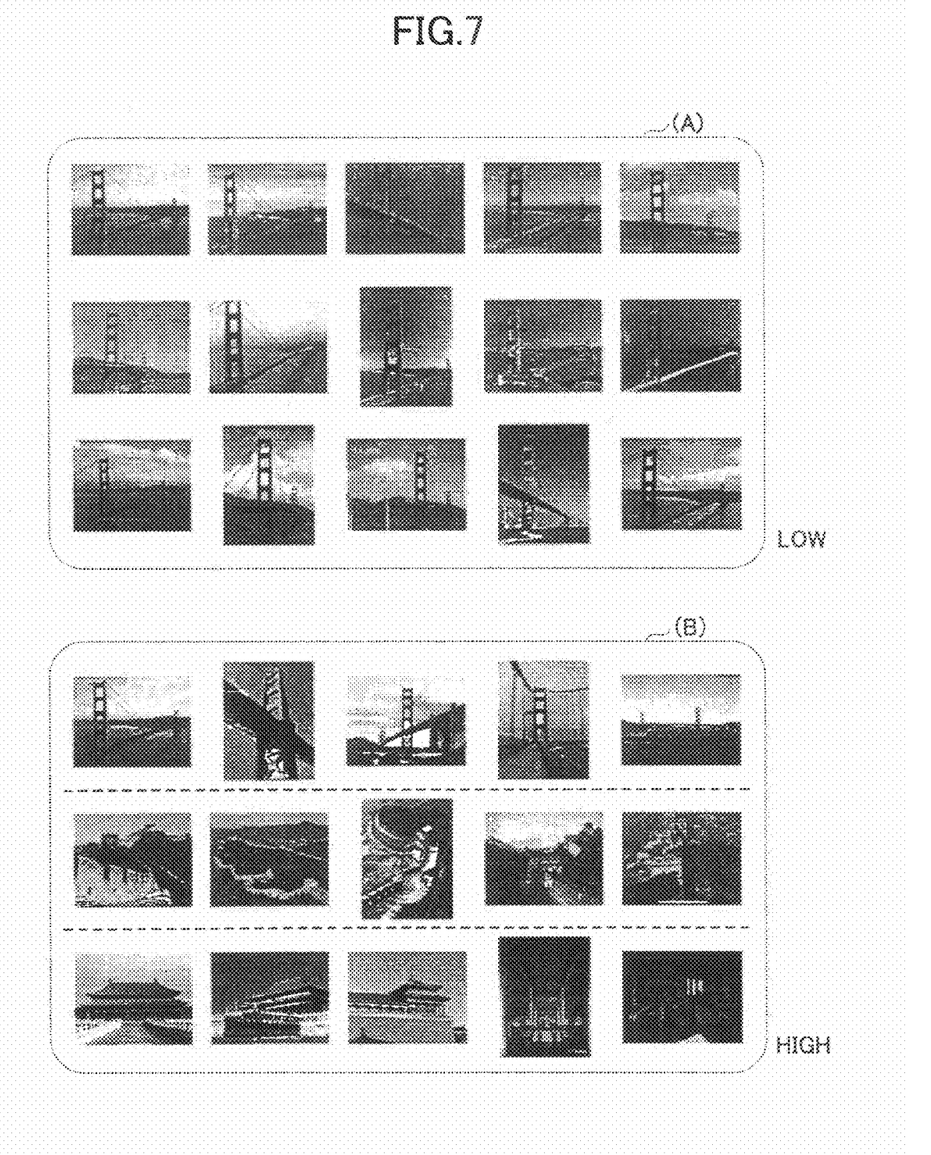
FIG. 7 illustrates the meaning of expressing diversity by using two image groups (A) and (B).

FIG. 7 illustrates the meaning of intuitively expressing diversity by using two image groups (A) and (B). In FIG. 7, there are two image groups (A) and (B) in which image group (A) includes many images having the same nature, so its diversity is low, whereas image group (B) includes plural images presenting various locations and various views, so its diversity is high.

As a result, it is apparent that the determination of the diversity data is helpful for determining representative images. For example, in a case of an electronic photo album, if two photos have photographing times very close to each other, then it means that they trend toward having similar sense-of-vision expressions; therefore they should not be simultaneously selected as the representative images. Again, for example, if all the photos in one folder are named a special name, for example, "year-end party" by the user, then maybe these photos are used for recording the same event; therefore these photos should not be simultaneously selected as the representative images.

In particular, the diversity data obtaining unit 102 may obtain, based on the text features of the images, diversity data in matrix format (hereinafter, sometimes called a diversity matrix) as follows.

It is supposed that there are M images in an image set $X=\{x_i | i=0, \ldots, M-1\}$; here refers to the i-th image. A corresponding text feature vector of the i-th image is expressed as $t_i=[t_{i1}, t_{i2}, \ldots, t_{iK}]^T$; here K refers to a dimension of a text feature space that will be concretely described below. The diversity matrix of the image set may be expressed as $D=[d_{ij}]_{(M \times M)}$; here the element $d_{ij}$ refers to the discrepancy between the i-th image and the j-th image.

As an embodiment that is not used to limit the present invention, it is possible to obtain each element $d_{ij}$ in the diversity matrix D based on distance between any two images in the text feature space that will be concretely described below.

As an example, each element $d_{ij}$ in the diversity matrix D may be obtained by using the following equation (1) according to the Euclidean distance.

$$d(t_i, t_j) = \sqrt{\sum_{m=1}^{K}(t_{im}-t_{jm})^2} \quad (1)$$

Again, as an example, each element $d_{ij}$ in the diversity matrix D may be obtained by using the following equation (2) according to the p-norm distance.

$$d(t_i, t_j) = (\sum_{m=1}^{K}(t_{im}-t_{jm})^p)^{1/p} \quad (2)$$

Here p is a real number, and may be set to any value according to demand in practice.

As another example, each element $d_{ij}$ in the diversity matrix D may be obtained by using the following equation (3) according to the Kullback-Leibler distance.

$$d(t_i, t_j) = \sum_{m=1}^{K} \left( p(t_{im}) \log \frac{p(t_{im})}{p(t_{jm})} + p(t_{jm}) \log \frac{p(t_{jm})}{p(t_{im})} \right) \quad (3)$$

Here p(•) refers to a probability distribution of the text feature vector, and its value may be estimated based on positions of the images in the text feature space. It should be noted that since approaches of calculating the probability distribution are known by those skilled in the art, they are omitted here.

In the above-mentioned equations (1)-(3), as described above, $t_i$ and $t_j$ refer to the text feature vectors of the i-th image and the j-th image, respectively, and K refers to the dimension of the text feature space.

It should be noted that those practiced in the art can understand that the diversity matrix D may be obtained based on not only the above-mentioned distance information between the two images but also degree of similarity, mutual information or the like between the two images.

The representative score calculating unit 103 calculates representative scores of all the images in the image set based on the diversity data. Each of the representative scores is used to express representativeness of the content of the corresponding image with regard to the contents of all the images in the image set. In a case of this embodiment, the representative scores of the images directly correlate with the row vectors or the column vectors corresponding to the images in the diversity matrix of the image set. In other words, in a case of this embodiment, the representative score of one of the images directly represents the discrepancy between the one image and the other images in the image set. The higher the discrepancy of the one image with the other images in the image set is, the higher the representative score is; otherwise, the lower the representative score is. The operation of the representative score calculating unit 103 will be concretely described below.

The representative image selecting unit 104 selects one or more images that can represent the contents of all the images in the image set. In other words, the representative image selecting unit 104 picks up an image subset having sufficient representativeness from the image set. In particular, the selected images should have the biggest discrepancies between themselves and the other images in the image set.

According to the first embodiment of the present invention, the representative image seeking system 100 is able to extract the text features of all the images in the image set based on the original data and/or the annotation information input by the user, obtain the diversity data of the image set based on the text features of the images so as to obtain the representative scores of the images, and select the representative images of the image set based on the representative scores of the images. Therefore the representative image seeking system 100 according to the first embodiment of the present invention is able to automatically seek out the representative images in the image set in an effective way.

Figure 2:
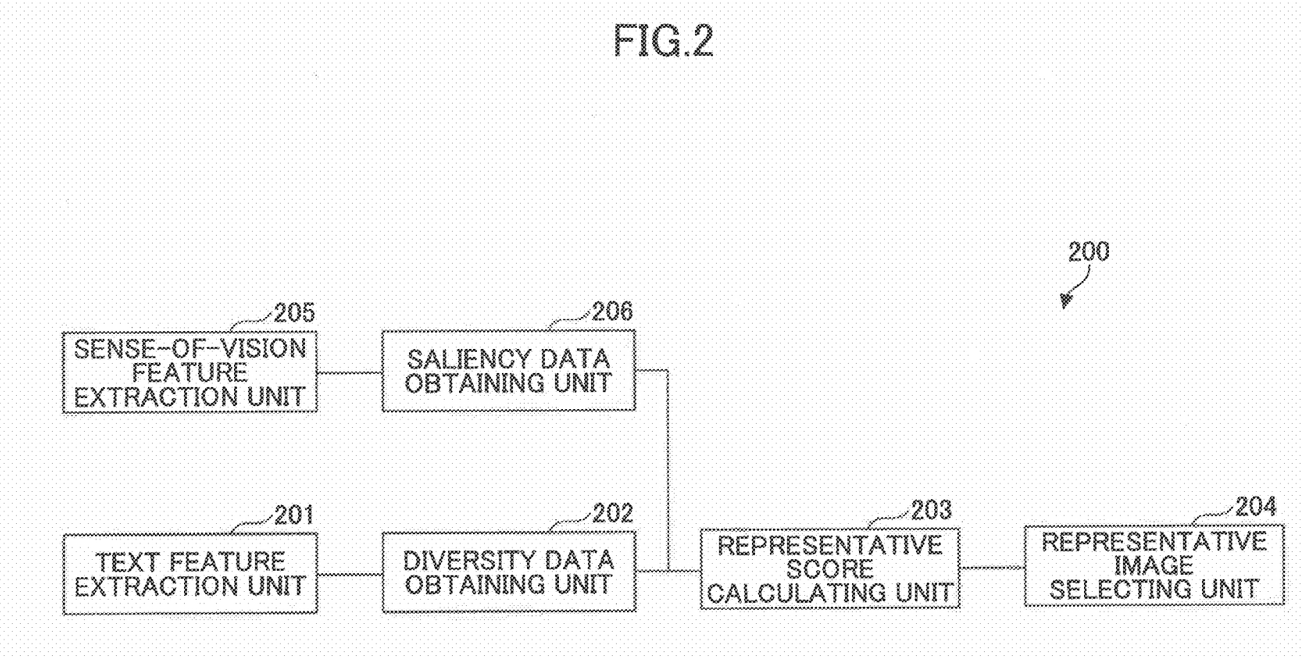
FIG. 2 is a block diagram of a representative image seeking system 200 according to another embodiment of the present invention.

In what follows, the arrangement of a representative image seeking system 200 according to another embodiment of the present invention is described by referring to FIG. 2.

As shown in FIG. 2, the representative image seeking system 200 according to the another embodiment of the present invention comprises a text feature extracting unit 201, a diversity data obtaining unit 202, a representative score calculating unit 203, a representative image selecting unit 204, a sense-of-vision feature extracting unit 205, and a saliency data obtaining unit 206. It should be noted that the arrangements and the operations of the text feature extracting unit 201, the diversity data obtaining unit 202, and the representative image selecting unit 204 are the same with those of the text feature extracting unit 101, the diversity data obtaining unit 102, and the representative image selecting unit 104 as shown in FIG. 1; as a result, they are omitted here. In what follows, the arrangements of the sense-of-vision feature extracting unit 205, the saliency data obtaining unit 206, and the representative score calculating unit 203 are mainly described by referring to FIG. 2.

In the representative image seeking system 200 according to the other embodiment of the present invention, the sense-of-vision extracting unit 205 extracts sense-of-vision features of the images in the image set. It should be noted that those trained in the art may employ any known methods to extract the sense-of-vision features of the images. For example, first the sense-of-vision feature extracting unit 205 makes up a sense-of-vision feature space of the image set by employing a known method based on parameters of color, texture, shape, etc.; then the sense-of-vision extracting unit 205 extracts the sense-of-vision features of the images in the sense-of-vision space. The parameters include but are not limited to features of texture descriptions based on the Local Binary Pattern (LBP), features of block-wise color moment in the Lab Color Space, features of histograms along edge directions, sub features of Fourier descriptions, etc.

Figure 8:
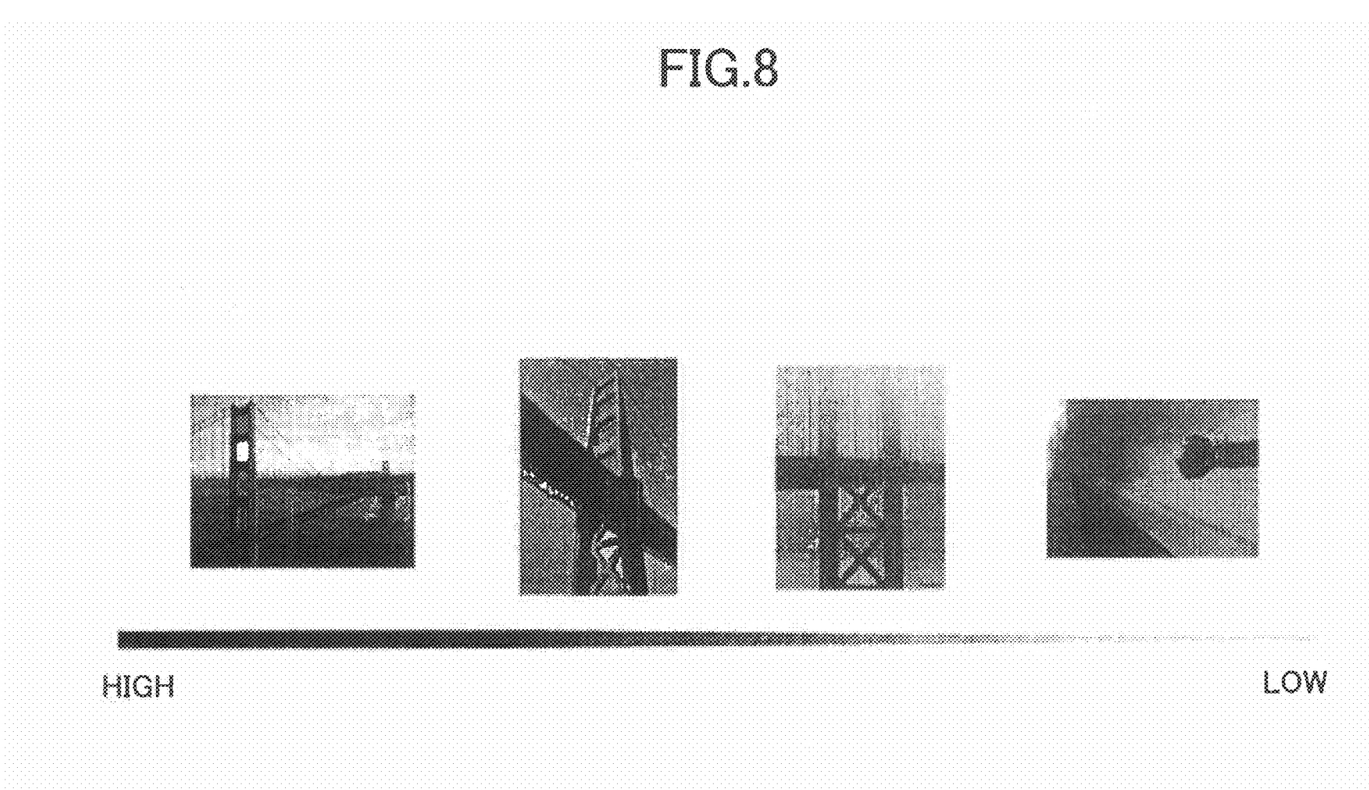
FIG. 8 illustrates the meaning of expressing saliency by using plural images.

The saliency data obtaining unit 206 obtains saliency data of the images based on the sense-of-vision features of the images. The saliency data stands for universality of each image with regard to the image set, i.e., the degree of each image belonging to the image set. In other words, saliency defines the degree of importance of each image in the image set. The more images similar in appearance an image has in the image set, the more universal the content of the image is in the image set, i.e., the higher the degree of importance of the image is, and correspondingly, the higher the saliency data of the image is. In particular, the saliency of the image set may be expressed as a vector; here each element of the vector refers to the saliency of one image. FIG. 8 illustrates the meaning of instinctive expressing saliency by using plural images. In FIG. 8, there are four images that are related to a topic keyword "Golden Bridge", and the saliency data becomes lower and lower from the left to the right.

As a result, it is apparent that aside from the diversity data, the determination of the saliency data is also helpful for determining the representative images. The reason is that, in general, an image having high saliency is very similar to other images belonging to the same category, and an image having high saliency usually is the clearest salient area of filling images or appears by using one of some common postures. These conditions may provide the most information related to a theme that the image wants to present.

In particular, the saliency data obtaining unit 206 according to this embodiment obtains the saliency data as follows.

In the above-mentioned image set $X=\{x_i | i=0, \ldots, M-1\}$, the sense-of-vision feature vector of the i-th image may be expressed as $v_i = [v_{i1}, v_{i2}, \ldots, v_{iJ}]^T$; here J is the dimension of the sense-of-vision feature space. The saliency data of the image set may be expressed as $s = [s_0, s_1, \ldots, s_{M-1}]^T$; here the element $s_i$ refers to the saliency data of the i-th image.

As an embodiment that is not used to limit the present invention, the saliency data is obtained based on considering kernel density estimation in the above-described the sense-of-vision feature space.

As an example, the saliency data $s_i$ of the i-th image is obtained by employing the following equation (4) according to a basic trigonometric function.

$$s_i = 1 - \Sigma_{x_j \in knn(x_i)} d(v_i, v_j) \quad (4)$$

Here $d(v_i, v_j)$ refers to the Euclidean distance between the i-th image and the j-th image in the sense-of-vision feature space as shown in the following equation (4-1).

$$d(v_i, v_j) = \sqrt{\Sigma_{m=1}^{J}(v_{im} - v_{jm})^2} \quad (4-1)$$

Again, as an example, the saliency data $s_i$ of the i-th image is obtained by employing the following equation (5) according to the Gaussian function.

$$s_i = \frac{1}{\sqrt{2\pi}} \sum_{x_j \in knn(x_i)} e^{\frac{d(v_i, v_j)}{-2h}} \quad (5)$$

Here h refers to a smoothing parameter, also called bandwidth.

As another example, the saliency data $s_i$ of the i-th image is obtained by employing the following equation (6) according to the cosine function.

$$s_i = \frac{\pi}{4} \sum_{x_j \in knn(x_i)} \cos\left(\frac{\pi \times d(v_i, v_j)}{2h}\right) \quad (6)$$

Here, in the above-mentioned equations (4)-(6), $knn(x_i)$ refers to k neighboring images closest to the image $x_i$ in the sense-of-vision feature space.

In this way, the saliency data obtaining unit 206 according to this embodiment obtains the saliency data of the images, and outputs it to the representative score calculating unit 203.

The representative score calculating unit 203 according to this embodiment calculates representative scores of the images in the image set based on the diversity data output from the diversity data obtaining unit 202 as well as the saliency data output from the saliency data obtaining unit 206.

In particular, as an example of how to calculate the representative scores, the representative score calculating unit 203 performs a random walk on an image graph so as to pass on the representative scores among the images. Each node of the image graph refers to an image, and the edge of the image graph is weighted by using the diversity of every pair of images. In a case of the image graph having M nodes, $r_l(i)$ is used to refer to the representative score of node i at time of a first iteration; here the value of l may be suitably selected by those educated in the art based on the size of the image set and the required accuracy in practice. The representative scores of all the nodes in the image graph at time of the first iteration make up a column vector $r_l = [r_l(0), r_l(1), \ldots, r_l(M-1)]^T$. It is supposed that P refers to a transition matrix, and the element $P_{ij}$ of the transition matrix P refers to transition probability from node i to node j and is calculated by using the following equation (7).

$$P_{ij} = \frac{d_{ij}}{\sum_t d_{it}} \quad (7)$$

Then the random walk performed by the representative score calculating unit 203 may be expressed as the following equation (8).

$$r_l(j) = \alpha \Sigma_i r_{l-1}(i) p_{ij} + (1-\alpha) s_j \quad (8)$$

Here α is a weight parameter whose value is between 0 and 1, and may be achieved by using a weighting member in practice. Furthermore those skilled in the art may properly select the value of α according to demand, for example, α=0.2 or α=0.5. By using the random walk performed by the representative score calculating unit 203, high saliency in the sense-of-vision feature space and high diversity in the text feature space are obtained at the same time. The convergence of the above-mentioned random walk is verified as follows.

Theorem: iterations of the equation (8) converge at a fixed point $r_\pi$.

Demonstration: the equation (8) may be rewritten as the following equation (9) in matrix format.

$$r_l = \alpha P r_{l-1} + (1-\alpha)s \qquad (9)$$

As a result, the following equation (10) can be obtained.

$$r_\pi = \lim_{n \to \infty}(\alpha P)^n r_0 + (1-\alpha)(\Sigma_{i=1}^n (\alpha P)^{i-1})s \qquad (10)$$

It should be noted that here the transition matrix P is normalized to 1. With regard to $0 \leq \alpha \leq 1$, there is $\gamma \leq 1$ so that $\alpha \leq \gamma$, and the following equation (11) can be obtained.

$$\begin{aligned}
\sum_j (\alpha P)_{ij}^n &= \sum_j \sum_l (\alpha P)_{il}^{n-1}(\alpha P)_{lj} \\
&= \sum_l (\alpha P)_{il}^{n-1}\left(\alpha \sum_j P_{lj}\right) \\
&= \sum_l (\alpha P)_{il}^{n-1}(\alpha) \\
&\leq \sum_l (\alpha P)_{il}^{n-1}(\gamma) \\
&\leq \gamma^n
\end{aligned} \qquad (11)$$

As a result, the sum of elements in each row of $(\alpha P)^n$ converges to zero. Therefore, according to the equation (10), the following equation (12) can be obtained.

$$r_\pi = (1-\alpha)(I-\alpha P)^{-1}s \qquad (12)$$

Here I is an identity matrix whose size is the same with that of P, i.e., the size of I is M×M.

This is a unique solution.

In other words, the representative score calculating unit 203 according to this embodiment obtained, based on the equation (8), the representative scores of the images by using the saliency data and the diversity data.

It should be noted that in a case of $\alpha=1$, the above-mentioned random walk corresponds to the operation of the representative score calculating unit 103 in the above embodiment.

Again, it should be noted that although the representative scores of the images are obtained by the representative score calculating unit 203 based on the equation (8) in this embodiment, those skilled in the art may employ other approaches to calculate the representative scores of the images by making various modifications to the equation (8).

In the representative image seeking system 200 according to this embodiment, the representative score calculating unit 203 calculates the representative scores of the images not only based on the diversity data obtained from the diversity data obtaining unit 202 but also based on the saliency data obtained from the saliency data obtaining unit 206 so that the two aspects of diversity and saliency are involved in the representative scores of the images; as a result, it is possible to seek out the representative images that can more sufficiently represent the overall content of the image set by a more effective way.

Figure 3:
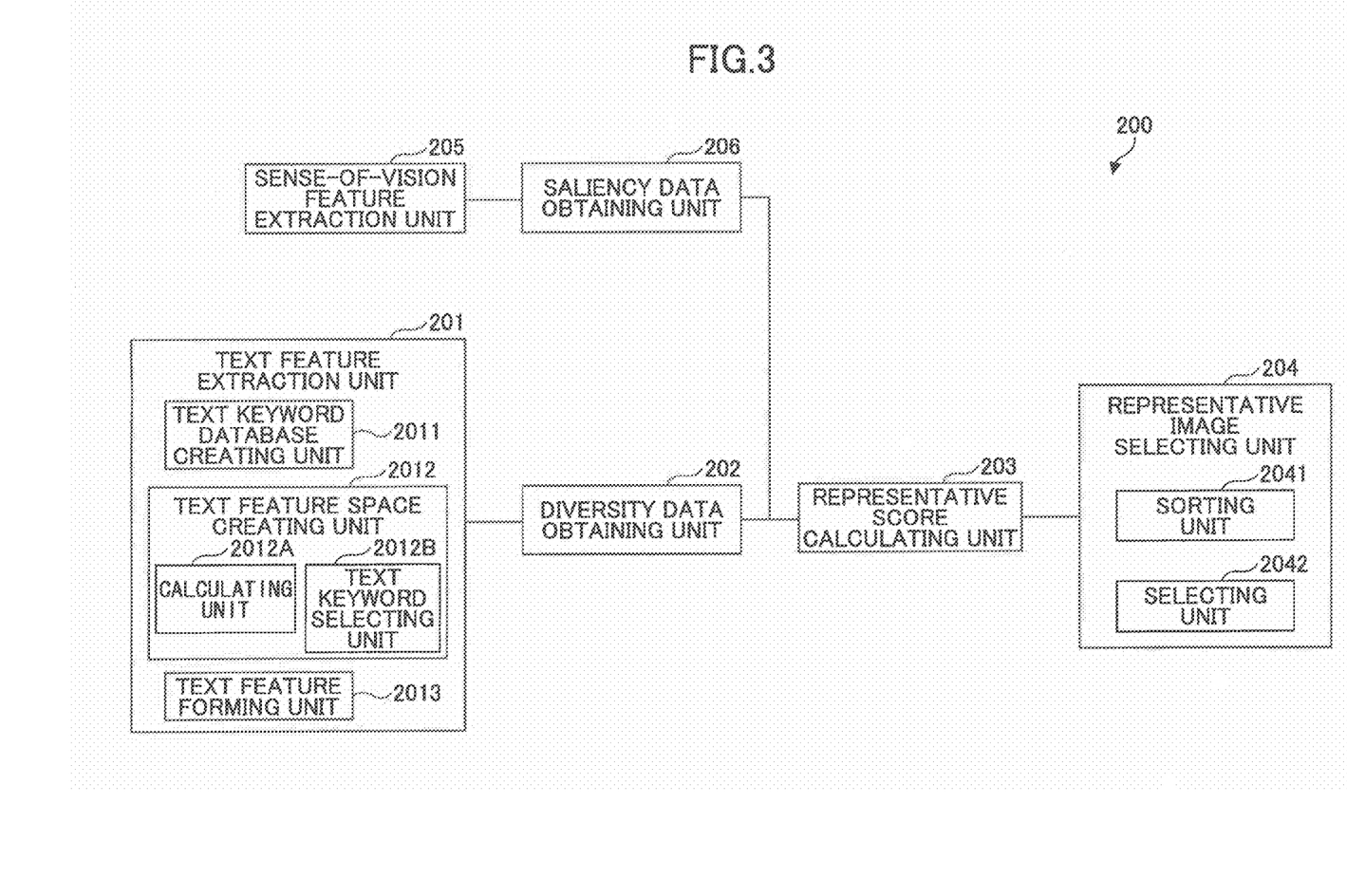
FIG. 3 is a concrete block diagram of the representative image seeking system 200 according to an embodiment of the present invention.

In what follows, the arrangement of the representative image seeking system 200 is concretely illustrated by referring to FIG. 3.

As shown in FIG. 3, the text feature extracting unit 201 preferably comprises a text keyword database creating unit 2011, a text feature space creating unit 2012, and a text feature forming unit 2013.

The text keyword database creating unit 2011 creates a text keyword database of the image set based on original data of all the images in the image set and/or annotation information input by a user.

Figure 9:
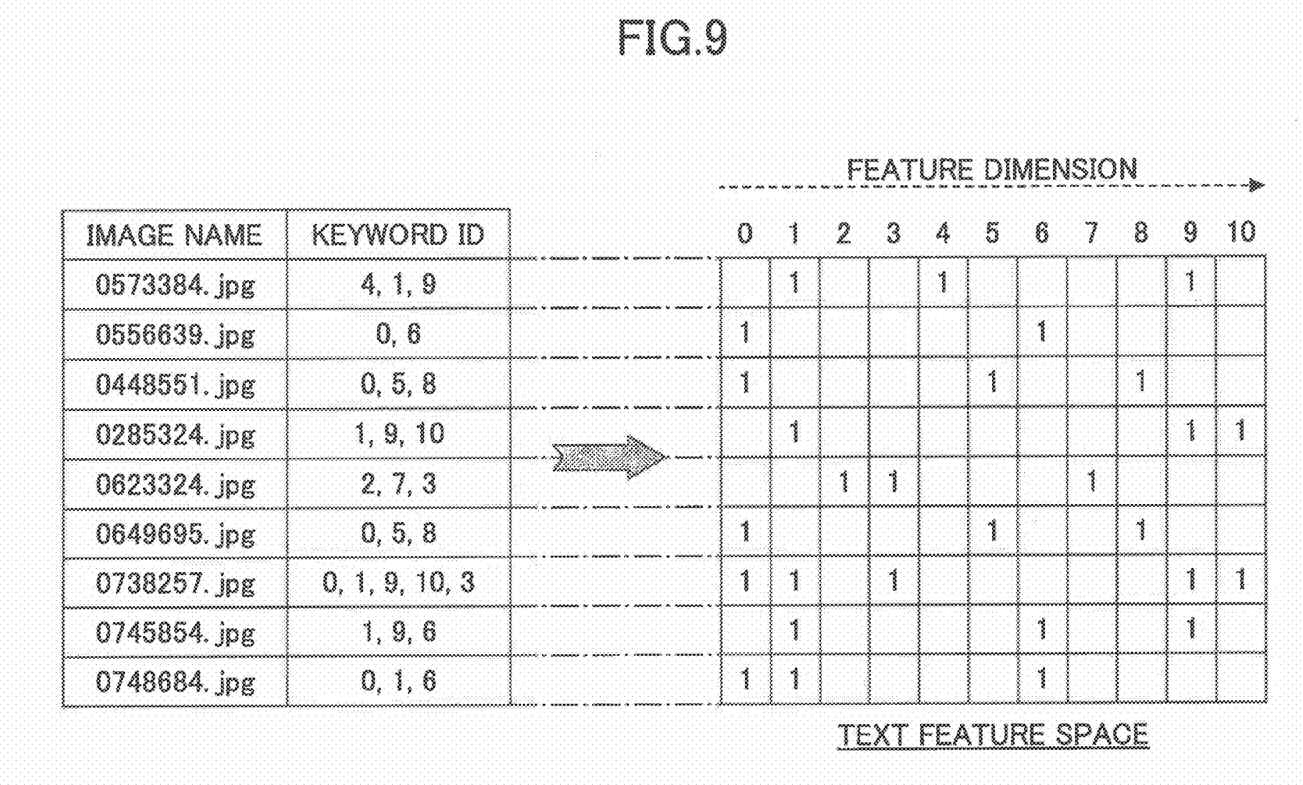
FIG. 9 illustrates a text feature space of plural images.

The text feature space creating unit 2012 selects one or more text keywords from the text keyword database to create a text feature space whose dimension is equal to the number of the selected text keywords. FIG. 9 illustrates a text feature space of all the images in an image set. In this image set, there are 9 images. In a text keyword database created based on original data of these 9 images and/or annotation information input by a user, 11 keywords are selected; as a result, the created text feature space has 11 dimensions, and the values in the respective dimensions in the text feature space, of the respective images refer to whether the respective images include the corresponding keywords. For example, "1" indicates that an image includes the corresponding keyword, and "0" indicates that an image does not include the corresponding keyword; contrariwise is okay too.

The text feature forming unit 2013 forms text features of all the images by using the text feature space based on the original data of all the images and/or the annotation information input by a user. For example, with regard to an image whose name is "0573384.jpg", its text keyword ID includes 4, 1, and 9; as a result, the text features of this image in the text feature space are (0, 1, 0, 0, 1, 0, 0, 0, 0, 1, 0). It should be noted that the above-mentioned approach of forming the text features by the text feature forming unit 2013 is just an example. That is, those trained in the art may employ other approaches, for example, an approach of counting the number of the text keywords included in each image, to form the text features of each image in the text feature space.

Preferably the text feature space creating unit 2012 further includes a calculating unit 2012A used to calculate appearance frequency of each keyword appearing in the text keyword database of the image set; and a text keyword selecting unit 2012B used to select the keywords whose appearance frequencies are in a predetermined range so as to create the text feature space. The reason is that in practice, there are a few keywords that have relatively little information and whose appearance frequencies are relatively high, for example, "one", "this", and "image", in general. These kinds of keywords are usually called "stop words" in information retrieval, and may negatively influence the reliability of a system. As a result, keywords whose appearance frequencies are higher than a predetermined value are preferably erased first. The predetermined value may be determined by those skilled in the art according to actual demands; this is a well-known matter, and its concrete description is omitted here.

Furthermore the representative image selecting unit 204 preferably includes a sorting unit 2041 used to sort the representative scores of all the images in the image set based on the representative scores of all the images; and a selecting unit 2042 used to select one or more images that can represent the contents of all the images in the image set.

Those skilled in the art may make use of various approaches in order to present the selected representative images to a user. For example, it is possible to present the images whose representative scores are high on a predetermined display area; it is possible to store the representative scores in a storage device, or to present them to a user by using other approaches, for example, an approach of displaying them in text keyword group format, or an approach of printing the representative scores in series.

Furthermore it should be noted that those practiced in the art may make various approaches for further utilizing the representative scores of the images. For example, it is possible to further analyze the representative scores, and/or to apply the representative scores to another process as its part. Again, for example, the text feature space according to the embodiments of the present invention may be used to create (or modify) a training sample set for classifying plural annotations by applying the text feature space to an annotation space.

Figure 4:
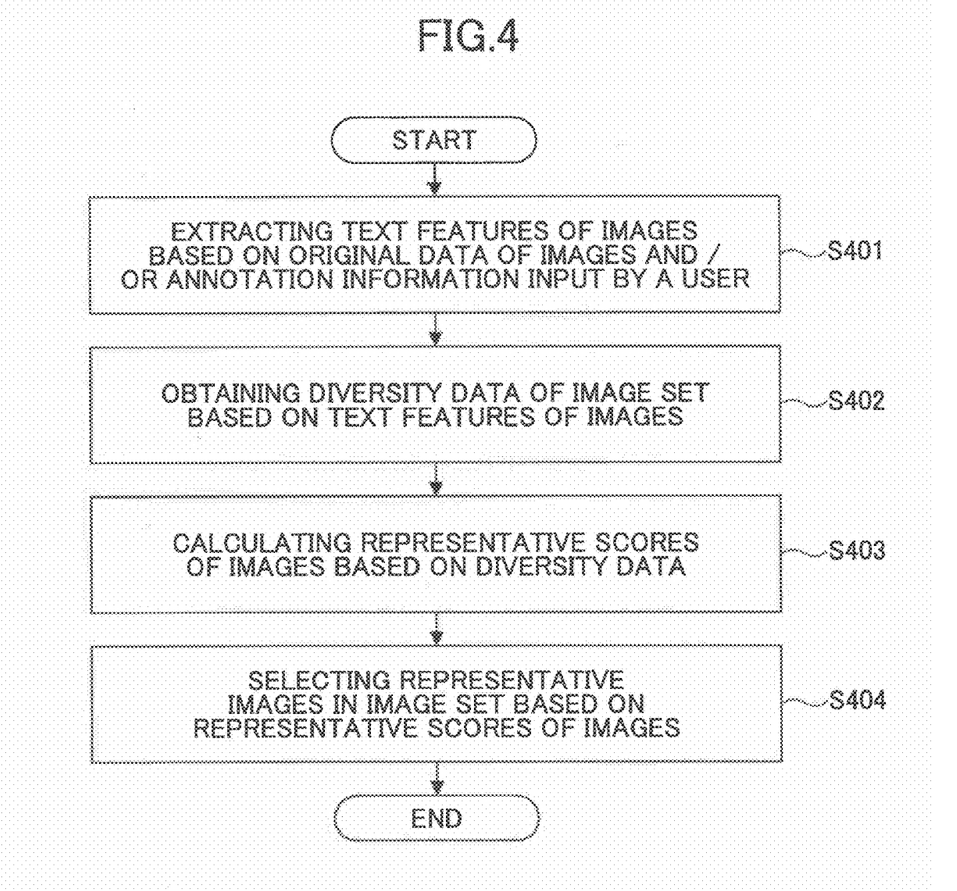
FIG. 4 is a flowchart of a representative image seeking method according to an embodiment of the present invention.
Figure 5:
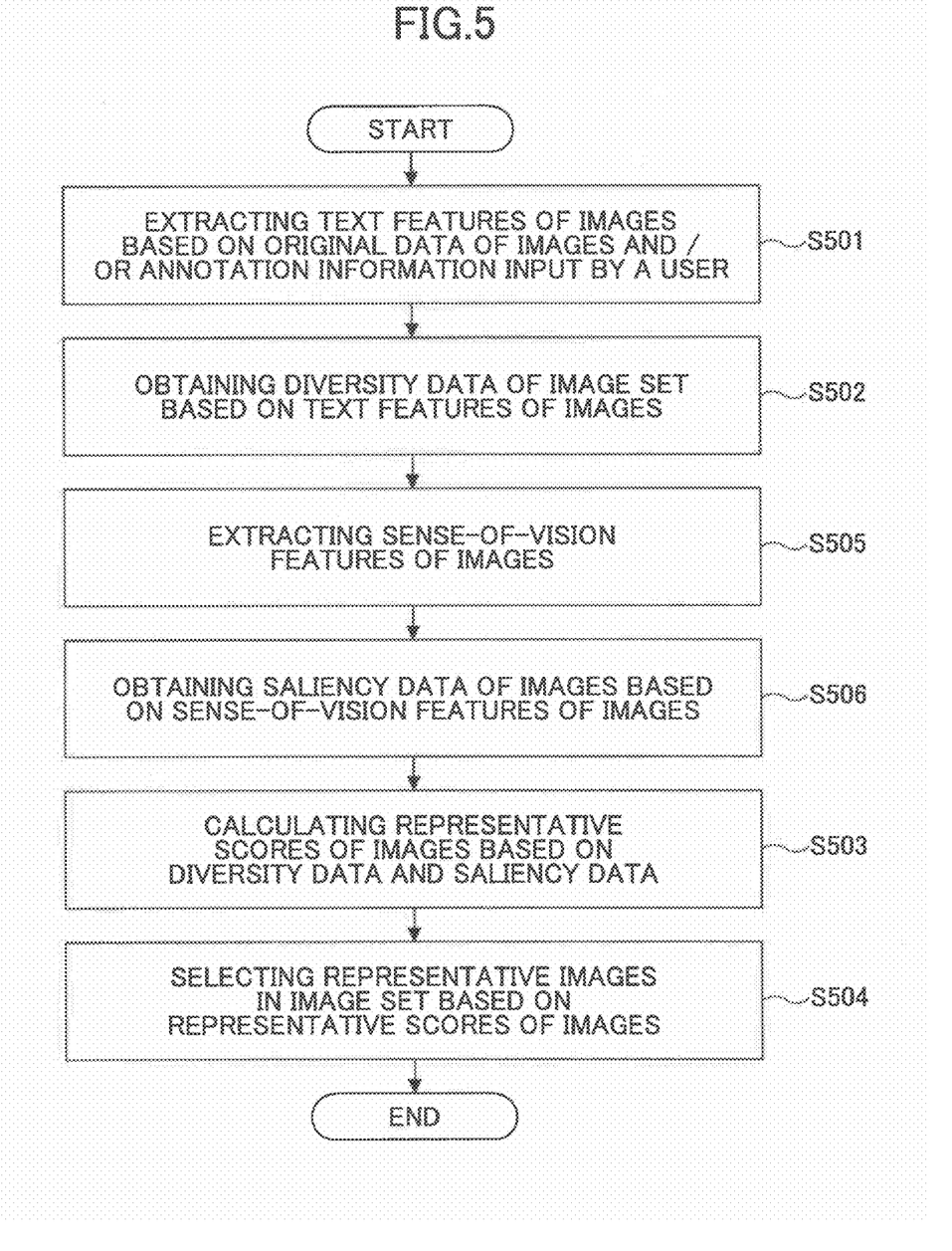
FIG. 5 is a flowchart of a representative image seeking method according to another embodiment of the present invention.
Figure 6:
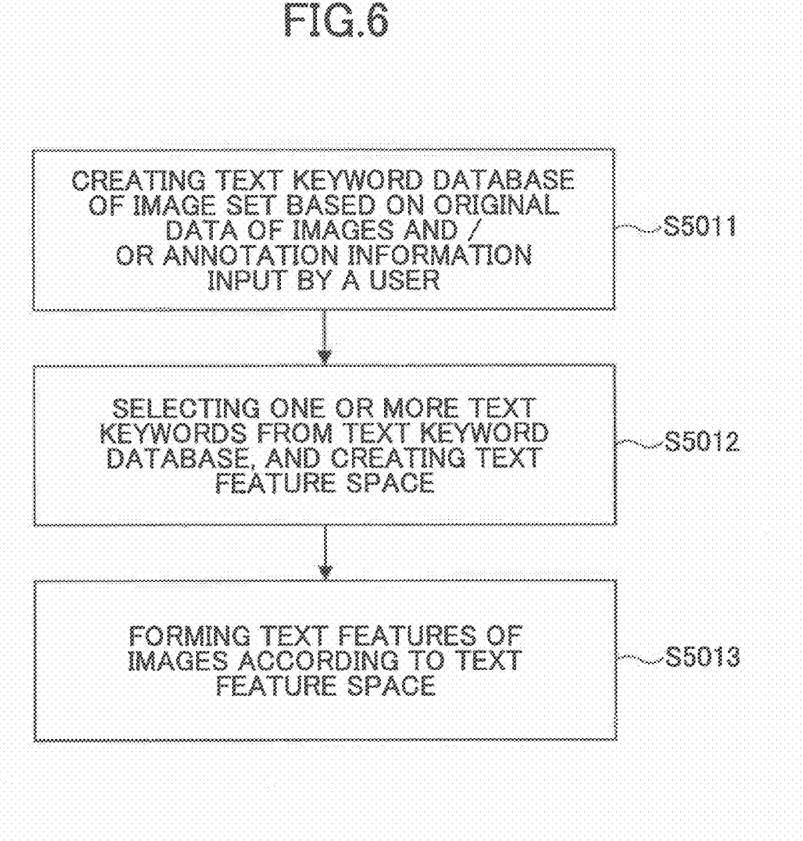
FIG. 6 is a flowchart of a text feature extraction step in a representative image seeking method according to an embodiment of the present invention.

In what follows, a representative image seeking method according to various embodiments of the present invention is illustrated by referring to FIGS. 4-6.

FIG. 4 is a flowchart of the representative image seeking method carried out by the representative image seeking system 100 according to the first embodiment of the present invention.

As shown in FIG. 4, in STEP S401, text features of images in an image set are extracted based on original data of the images and/or annotation information input by a user.

In STEP S402, diversity data of the image set is obtained based on the text features of the images in the image set. It should be noted that since the meaning of the diversity data and the approach of obtaining the diversity data are described above by referring to FIG. 1, they are omitted here.

In STEP S403, representative scores of the images in the image set are calculated based on the diversity data. It should be noted that since the meaning of the representative scores and the approach of calculating the representative scores are described above by referring to FIG. 1, they are omitted here.

In STEP S404, one or more images (i.e. representative images), which can represent contents of all the images in the image set, are selected based on the representative scores.

Therefore, based on the representative image seeking method according to this embodiment, it is possible to automatically seek the representative images in the image set in an effective way.

FIG. 5 is a flowchart of the representative image seeking method carried out by the representative image seeking system 200 according to the second embodiment of the present invention.

In the flowchart shown in FIG. 5, since processings in STEPS S501, S502, and S504 are the same with those in STEPS S401, S402, and S404 of the flowchart shown in FIG. 4, they are omitted here.

The difference between the flowchart shown in FIG. 5 and that shown in FIG. 4 is that, in the flowchart shown in FIG. 5, in STEP S505, sense-of-vision features of the images in the image set are extracted, and in STEP S506, saliency data of the images in the image set are extracted based on the sense-of-vision features of the images in the image set. It should be noted that since the meaning of the saliency data and the approach of obtaining the saliency data are described above by referring to FIG. 2, they are omitted here.

After obtaining the diversity data and the saliency data of the images in the image set, in STEP S503, representative scores of the images in the image set are calculated based on the diversity data and the saliency data. It should be noted that since the methods of calculating the diversity data and the saliency data are described above by referring to FIG. 2, they are omitted here.

Furthermore the processing in STEP S504 preferably includes a step of sorting the representative scores of all the images in the image set based on the representative scores of all the images in the image set; and a step of selecting one or more images that can represent the contents of all the images in the image set based on the sorted result.

Therefore, based on the representative image seeking method according to this embodiment, it is possible to select the representative images by comprehensively considering two aspects of diversity and saliency; as a result, it is possible to seek out the representative images that can more sufficiently represent the contents of all the images in the image set by a more effective way.

FIG. 6 is a flowchart of a text feature extraction step in the representative image seeking method according to an embodiment of the present invention.

As shown in FIG. 6, in STEP S5011, a text keyword database is created based on original data of all the images in an image set and/or annotation information input by a user.

In STEP S5012, a text feature space is created by selecting one or more text keywords from the text keyword database of the image set; here the dimension of the text feature space is the same as the number of the selected text keywords.

In STEP S5013, text features of all the images in the image set are formed by using the text feature space based on the original data of all the images in the image set and/or the annotation information input by the user.

Furthermore, in the processing of STEP S5012, the text feature space is preferably created by calculating appearance frequencies of all the text keywords appearing in the text keyword database of the image set, and then selecting the text keywords whose appearance frequencies are in a predetermined range as the elements of the text feature space.

It should be noted that a series of processing steps described above may be executed by hardware or software. In a case where the processing is executed by the software, programs forming the software may be installed via networks or non-transitory computer-readable media.

In addition, a series of processing steps described above may not only include processing steps executed in order of time as described above but also include processing steps executed in parallel or individually, i.e., not executed in order of time. For example, the processing in STEPS S501 and S502 and the processing in STEPS S505 and 5506 may be executed at the same time.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010122006.8 filed on Mar. 11, 2010, the entire contents of which are hereby incorporated by reference.

What is claimed is:

1. A method of seeking one or more representative images in an image set including plural images stored in an electronic image database accessible by computer hardware, the method comprising:
   a text feature extracting step of extracting, by a processor of the computer hardware, one or more text features of each of the plural images in the image set based on original data of the corresponding images and/or annotation information input by a user, the text feature extracting step including:
   (1) a text keyword database creating step of creating a text keyword database of the image set based on the original data of all the images in the image set and/or the annotation information input by the user, (2) a text feature space creating step of creating a text feature space by selecting one or more text keywords from the text keyword database of the image set, the dimension of the text feature space being equal to the number of the selected text keywords, the text feature space creating step including:
  (i) an appearance frequency calculating step of calculating an appearance frequency of each of the text keywords appearing in the text keyword database of the image set, and
  (ii) a text keyword selecting step of selecting one or more of the text keywords whose appearance frequencies are in a predetermined range so as to create the text feature space, and
(3) a text feature forming step of forming the text features of each of the plural images by using the text feature space based on the original data of all the images in the image set and/or the annotation information input by the user;
a diversity data obtaining step of obtaining diversity data of the image set based on the text features of each of the plural images in the image set, wherein, the diversity data is used to express discrepancies between contents of any two images in the image set;
a representative score calculating step of calculating a representative score of each of the plural images based on the diversity data of the image set, wherein, the representative score is used to express a representativeness of a content of each of the plural images with regard to contents of all the images in the image set;
a sorting step of sorting the representative scores of each of the plural images; and
a representative image selecting step of selecting, based on the sorting, one or more of the images in the image set based on the representative score of each of the plural images in the image set, wherein, the one or more images represent the contents of all the images in the image set, and serve as the one or more representative images.

2. The method according to claim 1, further comprising:
a sense-of-vision feature extracting step of extracting one or more sense-of-vision features of each of the plural images in the image set; and
a saliency data obtaining step of obtaining saliency data of each of the plural images based on the sense-of-vision features of the corresponding images in the image set, wherein, the saliency data is used to express a universality of each of the plural image with regard to the image set,
wherein, the representative score is further based on the saliency data.

3. The method according to claim 1, wherein, the representative image selecting step comprises:
a sorting step of sorting the representative scores of all the images in the image set based on the representative score of each of the plural images in the image set; and
an image selecting step of selecting the one or more images in the image set based on the sorted result, wherein, the one or more images represent the contents of all the images in the image set, and serve as the one or more representative images.

4. A computer hardware system for seeking one or more representative images in an image set including plural images stored in an electronic image database accessible by the computer hardware system, the computer hardware system configured to execute, by computer hardware including a processor:

a text feature extracting unit configured to extract one or more text features of each of the plural images in the image set based on original data of the corresponding images and/or annotation information input by a user, the text feature extracting unit configured to execute:
  (1) a text keyword database creating unit configured to create a text keyword database of the image set based on the original data of all the images in the image set and/or the annotation information input by the user,
  (2) a text feature space creating unit configured to create a text feature space by selecting one or more text keywords from the text keyword database of the image set, wherein, the dimension of the text feature space is equal to the number of the selected text keywords, the text feature space creating unit configured to execute:
    (i) an appearance frequency calculating unit configured to calculate an appearance frequency of each of the text keywords appearing in the text keyword database of the image set, and
    (ii) a text keyword selecting unit configured to select one or more of the text keywords whose appearance frequencies are in a predetermined range so as to create the text feature space, and
  (3) a text feature forming unit configured to form the text features of each of the plural images by using the text feature space based on the original data of all the images in the image set and/or the annotation information input by the user;
a diversity data obtaining unit configured to obtain diversity data of the image set based on the text features of each of the plural images in the image set, wherein, the diversity data is used to express discrepancies between contents of any two images in the image set;
a representative score calculating unit configured to calculate a representative score of each of the plural images based on the diversity data of the image set, wherein, the representative score is used to express a representativeness of a content of each of the plural images with regard to contents of all the images in the image set;
a sorting unit configured to sort the representative scores of each of the plural images; and
a representative image selecting unit configured to select one or more of the images in the image set based on the sorted representative score of each of the plural images in the image set, wherein, the one or more images represent the contents of all the images in the image set, and serve as the one or more representative images.

5. The system according to claim 4, further configured to execute:
a sense-of-vision feature extracting unit configured to extract one or more sense-of-vision features of each of the plural images in the image set; and
a saliency data obtaining unit configured to obtain saliency data of each of the plural images based on the sense-of-vision features of the corresponding images in the image set, wherein, the saliency data is used to express a universality of each of the plural images with regard to the image set,
wherein, the representative score is further based on the saliency data.

6. The system according to claim 4, wherein, the representative image selecting unit is configured to execute:
a sorting unit configured to sort the representative scores of all the images in the image set based on the representative score of each of the plural images in the image set; and an image selecting unit configured to select the one or more images in the image set based on the sorted result, wherein, the one or more images represent the contents of all the images in the image set, and serve as the one or more representative images.

7. A non-transitory computer-readable medium having computer-executable instructions for execution by a processing system, wherein, the computer-executable instructions are for seeking one or more representative images in an image set including plural images, and the computer-executable instructions, when executed, cause the processing system to:

extract one or more text features of each of the plural images in the image set based on original data of the corresponding images and/or annotation information input by a user;

create a text keyword database of the image set based on the original data of all the images in the image set and/or the annotation information input by the user;

create a text feature space by selecting one or more text keywords from the text keyword database of the image set, wherein, the dimension of the text feature space is equal to the number of the selected text keywords;

calculate an appearance frequency of each of the text keywords appearing in the text keyword database of the image set;

select one or more of the text keywords whose appearance frequencies are in a predetermined range so as to create the text feature space;

form the text features of each of the plural images by using the text feature space based on the original data of all the images in the image set and/or the annotation information input by the user;

obtain diversity data of the image set based on the text features of each of the plural images in the image set, wherein, the diversity data is used to express discrepancies between contents of any two images in the image set;

calculate a representative score of each of the plural images based on the diversity data of the image set, wherein, the representative score is used to express a representativeness of a content of each of the plural images with regard to contents of all the images in the image set;

sort the representative scores of each of the plural images; and select one or more of the images in the image set based on the sorted representative score of each of the plural images in the image set, wherein, the one or more images represent the contents of all the images in the image set, and serve as the one or more representative images.

\* \* \* \* \*